(12) United States Patent
Butzer

(10) Patent No.: US 9,634,836 B1
(45) Date of Patent: Apr. 25, 2017

(54) KEY SHADOWING

(71) Applicant: Dane Charles Butzer, McKinney, TX (US)

(72) Inventor: Dane Charles Butzer, McKinney, TX (US)

( * ) Notice: Subject to any disclaimer, the term of this patent is extended or adjusted under 35 U.S.C. 154(b) by 285 days.

(21) Appl. No.: 14/589,920

(22) Filed: Jan. 5, 2015

Related U.S. Application Data

(60) Provisional application No. 62/034,366, filed on Aug. 7, 2014.

(51) Int. Cl.
   *H04L 9/00* (2006.01)
   *H04L 9/08* (2006.01)

(52) U.S. Cl.
   CPC ............ *H04L 9/0861* (2013.01); *H04L 9/085* (2013.01)

(58) Field of Classification Search
   CPC .............................. H04L 9/0861; H04L 9/085
   See application file for complete search history.

(56) References Cited

U.S. PATENT DOCUMENTS

| | | | | |
|---|---|---|---|---|
| 8,855,318 B1 * | 10/2014 | Patnala | ................. | H04L 9/0822 380/277 |
| 9,231,943 B2 * | 1/2016 | Panchapakesan | ..... | H04L 63/083 |
| 2011/0058668 A1 | 3/2011 | Yang et al. | | |

OTHER PUBLICATIONS

Verifiable Secret Sharing for Monotone Access Structures; Thomas Beth; 1st Conf.—Computer & Comm. Security '93-I1/93—VA,USA; 1993 ACM 0-89791-629-8/93/0011 (1993).
Construction of Multiplicative Monotone Span Program; Yuenai Chen; Chunming Tang; Foundation of National Natural Science of China under Grant No. 11271003, Guangdong Provincial Natural Science Foundation (China) under Grant No. S2012010009950, High Level Talents Project of Guangdong, and Science Research Project of Education Bureau in Guangzhou under Grant No. 2012A004 (2012).
A Taxonomy for Key Escrow Encryption Systems; Dorothy E. Denning and Dennis K. Branstad; Communications of the ACM (Mar. 1996/vol. 39, No. 3 ) (1996).
Secret Sharing Schemes with General Access Structure Based on MSPs; Jun Xu; Xiaomin Zha; Department of Mathematics, Xiamen University, Xiamen, 361005, China; Journal of Communications (vol. 2, No. 1, Jan. 2007).

* cited by examiner

*Primary Examiner* — Beemnet Dada

(57) ABSTRACT

A technique of generating key shadows performed by at least one computing device including at least one tangible computing element. The method includes receiving an indication of a first number X representing how many of the key shadows are to be generated, receiving an indication of a second number Y representing how many of the key shadows are to be required for decrypting an encrypted message, determining or receiving a master key for decrypting the encrypted message, and determining X key shadows of the master key. Y of those key shadows is sufficient to generate a range of more than one possible master keys that can be computationally feasibly searched for the master key. Less than Y of those key shadows is insufficient to determine any part of a value for the master key. Also, a technique of decrypting an encrypted message using Y of the key shadows. Further, associated systems.

18 Claims, 5 Drawing Sheets

KEY SHADOWING

CROSS-REFERENCE TO RELATED APPLICATION

This application claims the benefit of U.S. Provisional Application No. 62/034,366 titled "KEY SHADOWING" and filed 7 Aug. 2014 in the name of the same inventor as this non-provisional application.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND

The present disclosure generally relates to creating and using "key shadows" in a cryptographic context.

SUMMARY

Aspects of the subject technology include methods of generating key shadows performed by at least one computing device including at least one tangible computing element. The method includes receiving an indication of a first number X representing how many of the key shadows are to be generated, receiving an indication of a second number Y representing how many of the key shadows are to be required for decrypting an encrypted message, determining or receiving a master key for decrypting the encrypted message, and determining X key shadows of the master key. Y of those key shadows is sufficient to generate a range of more than one possible master keys that can be computationally feasibly searched for the master key. Less than Y of those key shadows is insufficient to determine any part of a value for the master key.

In some aspects, the method further includes encrypting each of the X key shadows with a different one of X personal keys and concatenating the encrypted X key shadows to the encrypted message.

Determining the X key shadows may further include dividing the master key into Z parts, and for each of the Z parts of the master key, determining a part of each of the X key shadows. Determining the part of each of the X key shadows may further include determining a point in a space having Y dimensions, wherein at least a part of the coordinates of the point in the space represents or can be combined to represent one of the Z parts of the master key, and determining at least X geometric constructs in the space that intersect at the point in the space. Each of the geometric constructs preferably may be determined from one part of each of the X key shadows. Determining the Z parts of each of the X key shadows for each of the Z parts of the master key may also include repeating determining the point and determining at least the X geometric constructs Z times.

The geometric constructs may include at least portions of n-spheres in the space. The centers of the n-spheres may be restricted to lie within the space. In some aspects, the point in the space is not collinear with any pair of the centers of the n-spheres in the space.

In some aspects, Z may be 1 or an integer greater than 1. The range of the possible master keys may include at least $2^Z$ of the possible master keys, wherein $2^Z$ represents a number of the possible master keys that can be computationally determined within an average human lifespan.

Other aspects of the subject technology include methods of decrypting a message using key shadows performed by at least one computing device including at least one tangible computing element. The method includes determining at least Y key shadows. The Y key shadows are sufficient to generate a range of more than one possible master keys that can be computationally feasibly searched for a master key. Less than Y of those key shadows is insufficient to determine any part of a value for the master key. The method also includes determining the master key based on the Y key shadows and decrypting the message using the master key.

In some aspects, determining at least Y key shadows may further include receiving Y personal keys and decrypting Y encrypted key shadows using the Y personal keys. The Y encrypted key shadows may have been concatenated to the message.

In other aspects, determining the master key from the Y key shadows may further include dividing each of the Y key shadows into Z parts and determining each of Z parts of the master key from parts of the Y key shadows. Determining each of the Z parts of the master key may also include modeling Y geometric constructs in a space having Y dimensions based on parts of the Y key shadows and determining at least one point in the space based on the Y geometric constructs. At least a part of the coordinates of the point in the space represents or can be combined to represent one of the Z parts of the master key.

Determining each of Z parts of the master keys from parts of the Y key shadows may further include repeating the steps of modeling Y geometric constructs and determining at least one point in the space based on the Y geometric constructs Z times. The geometric constructs may include at least portions of n-spheres in the space. The centers of the n-spheres may lie within the space. Z may be 1 or an integer greater than 1.

Determining at least one point in the space based on the Y geometric constructs may also include determining a pair of points in the space. In some aspects, at least a part of the coordinates of one of the pair of points in the space represents or can be combined to represent one of the Z parts of the master key, and the coordinates of the other of the pair of points in the space does not represent and cannot be combined to represent any part of the value for the master key. The coordinates of the Z pairs of the points preferably represent or can be combined to represent the range of possible master keys. The range of possible master keys preferably includes $2^Z$ of the possible master keys, only one of which is the master key. The method may further include searching the possible master keys for the master key.

The subject technology also includes systems having at least one tangible computing element configured to perform one or more of the foregoing methods.

This brief summary has been provided so that the nature of the invention may be understood quickly. Additional steps and/or different steps that those set forth in this summary may be used. A more complete understanding of the invention may be obtained by reference to the following description in connection with the attached drawings.

DETAILED DESCRIPTION

Figure 1:
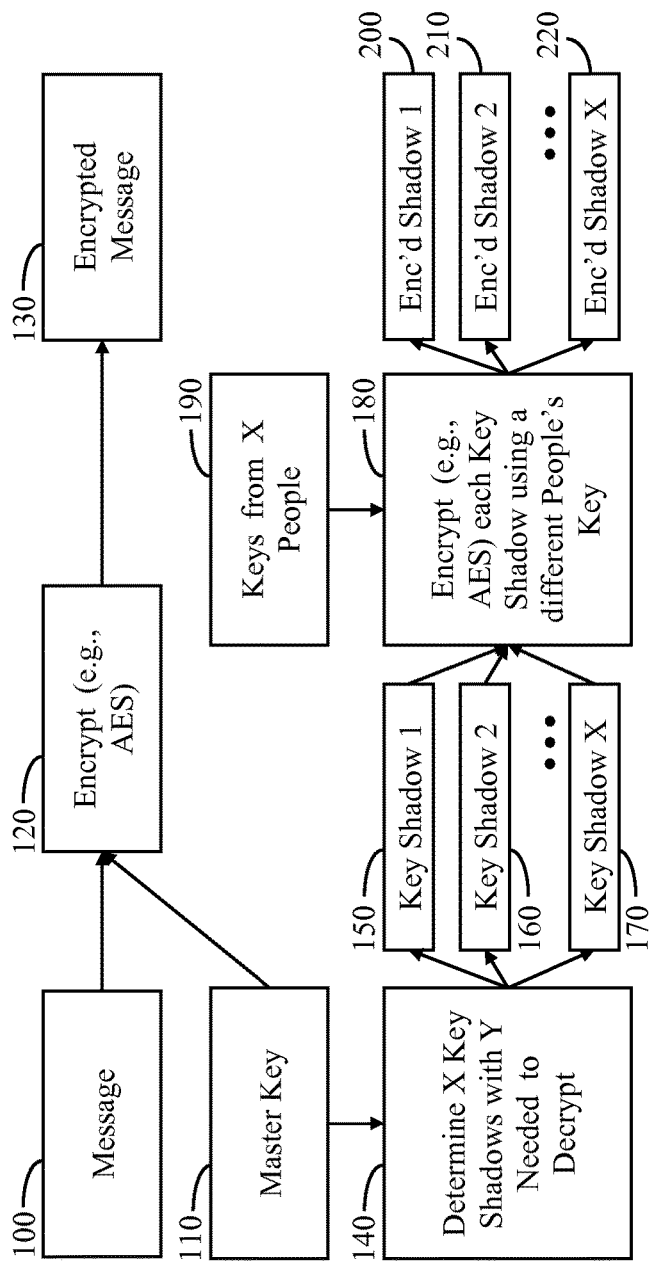
FIG. 1 illustrates generating encrypted key shadows according to aspects of the subject technology.

U.S. Provisional Application No. 62/034,366 titled "KEY SHADOWING" and filed 7 Aug. 2014 in the name of the same inventor as this non-provisional application, including its Appendix, is hereby incorporated by reference as if fully set forth herein.

A common problem when dealing with secret information in an organization is controlling access to that information. If the information is encrypted, then the person or people with the key for decrypting that encrypted information have access to the information. If only one person has that key and something happens to that person or the person leaves the organization, then the organization may no longer be able to access the information. If more than one person has the key and one of those people leaves the organization, that person might be able to give someone else unauthorized access to the information.

One possible solution to the foregoing issue is to encrypt the information multiple times. Thus, plural keys are needed to decrypt the encrypted information. The keys can be distributed to plural people so that no one person can give unauthorized access to the information. However, if something happens to any of those people, access to the information may be lost.

Another possible solution to the foregoing issue is to pass a key or keys to a trusted entity such as the organization's lawyer(s). However, this action does not really solve the problem. Rather, this action just moves the problem to the trusted entity.

A better solution would be technology that enables an organization to allow X people to choose keys for decrypting encrypted information, with any Y of those keys being both necessary and sufficient for decrypting the information. For example, an organization could allow 5 board members to choose their own keys, with any 3 of those keys being both sufficient and necessary for decrypting the information. The technology preferably would also include a mechanism for revoking a person's key without the person's participation. Aspects of the subject technology are intended to effect this solution.

In particular, some aspects of the subject technology include methods of generating key shadows performed by at least one computing device including at least one tangible computing element. The method includes receiving an indication of a first number X representing how many of the key shadows are to be generated, receiving an indication of a second number Y representing how many of the key shadows are to be required for decrypting an encrypted message, determining or receiving a master key for decrypting the encrypted message, and determining X key shadows of the master key. Y of those key shadows is sufficient to generate a range of more than one possible master keys that can be computationally feasibly searched for the master key. Less than Y of those key shadows is insufficient to determine any part of a value for the master key. In some aspects, the method further includes encrypting each of the X key shadows with a different one of X personal keys and concatenating the encrypted X key shadows to the encrypted message.

Encryption

FIG. 1 illustrates generating encrypted key shadows according to aspects of the subject technology. Message 100 contains information to be encrypted. The message may be have already been encrypted for added security, although this need not be the case. A random master key 110 is or has been generated. A cryptographically secure process preferably is used to generate the key. Examples include a cryptographically valid pseudo-random number generator (PRNG) or a true random number generator (TRNG) such as a quantum noise based number generator. Alternatively, a master key may be received or otherwise determined. Master key 110 is used to encrypt 120 message 100 resulting in encrypted message 130, for example using AES, IDEA, or any other suitable encryption process.

In other aspects, the message may have been encrypted using a public key and an asymmetric cryptographic algorithm such as the RSA asymmetric encryption algorithm. The corresponding private key necessary for decrypting the message may then be used as the master key 110. Any other form of encryption may be used to encrypt the message, with the key necessary for decrypting the message used as master key 110.

X key shadows of master key 110 are determined 140 from master key 110. Y of those key shadows is sufficient to generate a range of more than one possible master keys that can be computationally feasibly searched for the master key. Less than Y of those key shadows is insufficient to determine any part of a value for the master key. Note: The length of the master key might be determinable from one key shadow, but not the value of the master key. One possible technique for determining the key shadows is explained below with respect to FIG. 3.

According to aspects of the subject technology, key shadows 150, 160, and 170 are encrypted 180 using personal keys 190 from X people, resulting in encrypted key shadows 200, 210, and 220. Any form of encryption algorithm may be used to encrypt the key shadows, including symmetric, asymmetric, and hybrid algorithms. Note: While 3 key shadows and 3 encrypted key shadows are shown in FIG. 1, those represent X key shadows and X encrypted key shadows.

Figure 2:
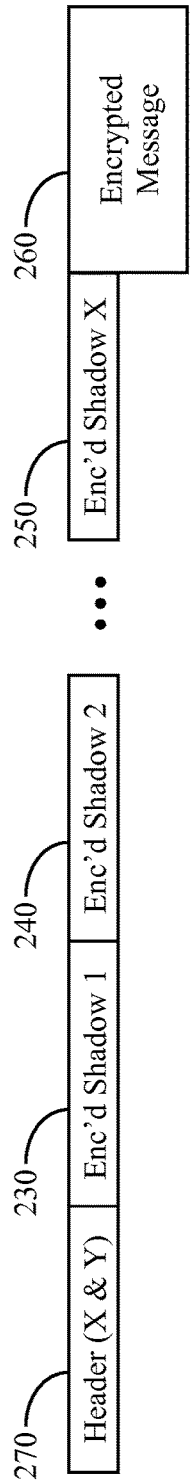
FIG. 2 illustrates an encrypted message stored along with encrypted key shadows according to aspects of the subject technology.

FIG. 2 illustrates an encrypted message stored along with X encrypted key shadows according to aspects of the subject technology. Encrypted key shadows 230, 240, and 250 (representing X encrypted key shadows) are or are copies of encrypted key shadows 200, 210, and 220. Encrypted message 260 is or is a copy of encrypted message 130. In some aspects, header 270 includes information useful for decrypting the encrypted message using Y of the key shadows, for example the values of X and Y. Additional information may also be stored with the encrypted message, for example but not limited to a hash, error correction information, a digital signature, and the like.

Generating Key Shadows

The following describes one possible technique for generating key shadows for a master key. The subject technology is not limited to this technique. Some background mathematics may be useful for understanding this technique.

Spaces having (almost) any number of dimensions can be modeled by a computing device. These spaces are generally referred to as n-spaces. An n-sphere is a construct of all points in an n-space that are equidistant from a point in the n-space. The "n" for an n-sphere is one less than the "n" for the space in which the n-sphere it resides. For a given n-space, such n-spheres will be referred to as (n−1)-spheres in this disclosure. Examples of n-spheres follow:

- 0-sphere: A pair of points in a one-dimensional space (i.e., a line) equidistant from a point in the one-dimensional space.
- 1-sphere: A circle in a two-dimensional space (i.e., a plane) whose points are all equidistant from a point in the two-dimensional space.
- 2-sphere: A surface of a ball in a three-dimensional space (i.e., a volume) whose points are all equidistant from a point in the three-dimensional space.
- 3-sphere: A surface of a hyper-ball in a four-dimensional space (i.e., a hyper-volume) whose points are all equidistant from a point in the four-dimensional space.
- 4-sphere: A surface whose points are all equidistant from a point in a five-dimensional space.

N-spheres can be of any number of dimensions following the same pattern as illustrated by the foregoing examples.

In an n-space, n number of (n−1)-spheres with centers equidistant from a point that lies on those (n−1)-spheres will intersect at two points as long as neither of those points is co-linear with the centers of any of the (n−1)-spheres. For example:

- In a plane (i.e., a two-dimensional space), two circles (i.e., 1-spheres) with centers equidistant from a point that lies on those circles will intersect at two points as long as neither of those points is co-linear with the centers of either of the circles.
- In a volume (i.e., a three-dimensional space), three surfaces of balls (i.e., 2-spheres) with centers equidistant from a point that lies on those surfaces will intersect at two points as long as neither of those points is co-linear with the centers of any of the surfaces.
- In a hyper-volume (i.e., a four-dimensional space), four balls (i.e., 3-spheres) with centers equidistant from a point that lies in those balls will intersect at two points as long as neither of those points is co-linear with the centers of any of the balls.

Given the centers of n such (n−1)-spheres in n-space, the two points of intersection can be determined using well known mathematical techniques. Examples of such techniques are described in *Reliable Computation of the points of Intersection of N Spheres in $IR^n$* by I. D. Coope published by the Australian Mathematical Society on Nov. 27, 2000. *Reliable Computation of the points of Intersection of N Spheres in $IR^n$* (the "incorporated document") is hereby incorporated as if fully set forth herein. A copy of the incorporated document is also filed as an Appendix to this disclosure.

For example, given the centers of two circles in a plane that (1) intersect and (2) have centers that are not co-linear with one point where the circles intersect, the two circles will intersect at two points. The two points where the circles intersect can be determined using well-known techniques such as those described in the incorporated document. Other techniques for determining the two points of intersection of n number of (n−1)-spheres in n-space are well known in mathematics and computer science. The subject technology is not limited to any of those particular techniques.

The foregoing principals are valid for any number of dimensions. Aspects of the subject technology use these principals to generate key shadows for a master key. A technique of doing so is described below with respect to FIG. 3.

The information available to the described technique includes a first number X representing how many of key shadows are to be generated, a second number Y representing how many of the key shadows are to be required for decrypting an encrypted message, and possibly a master key for decrypting the encrypted message.

In step 300, a space having Y dimensions is modeled. Modeling of the space may be performed by defining or allocating arrays that include Y elements or in some other fashion.

The space preferably has a pre-defined size in each dimension. A point in the space is determined in step 310. At least a part of the coordinates of the point in the space represents or can be combined to represent (referred to as "corresponding to" hereinafter) the master key. For example, in a four-dimensional space, the point will have four coordinates. One of those coordinates may correspond to the value of the master key. Alternatively, the coordinates may be XORd together to represent the value of the master key. In yet another alternative, a cryptographic hash may be applied to the coordinates or a portion thereof to arrive at the master key. In some aspects, determining the point in the space may also serve to determine the master key. Other techniques may be used to determine the point in the space and/or the master key.

In a preferred aspect, only some portion of one or more coordinates of the point correspond to the master key. For example, if the space is defined as having 0 to $2^{32}-1$ points along each dimension (i.e., each coordinate is represented by a 32 bit integer), then only $2^{16}$ of the point's coordinates (i.e., 16 of those bits for each dimension) preferably correspond to the master key. Thus, the modeled space is filled with many points that correspond to the same master key. Some value other than half of the total number of bits representing each coordinate may be used. Furthermore, to help alleviate possible errors in calculations, some number of the least significant bits of the point's coordinates preferably do not affect the value of the master key corresponding to the point.

At least X geometric constructs in the space that intersect at the point corresponding to the master key in the space are determined in step 320. In some aspects, the geometric constructs are (n−1)-spheres having a pre-defined radius r, where n equals Y, r equals approximately half of the total size of a dimension in the modeled space, and the centers of the (n−1)-spheres are points r distance away from the point corresponding to the master key in the space. Hence, the (n−1)-spheres all intersect at the point.

The centers of the (n−1)-spheres preferably reside in the modeled space at angles that are randomly determined (e.g., via a PRNG or TRNG) in each dimension away from the point corresponding to the master key. Furthermore, preferably no two centers are co-linear with the point in the space. (This need not be the case; however, having centers of any two (n−1)-spheres co-linear with the point in the space may result in a slight cryptographic weakness because those two (n−1)-spheres will intersect at only one point. The ramifications of only having one point of intersection between any two (n−1)-spheres will be discussed below with respect to FIG. 5.)

Only portions of the (n−1)-spheres may reside in the modeled space. However, a significant portion of all the (n−1)-spheres preferably do reside in the space. With r limited to approximately half of the total size of a dimension in the modeled space and the centers of the (n−1)-spheres limited to reside in the modeled space, at least approximately $(1/2)^n = (1/2)^Y$ of each (n−1)-sphere should reside in the modeled space. Preferably, the portion of each (n−1)-sphere in the space will cover points that correspond to all possible master keys.

Figure 3:
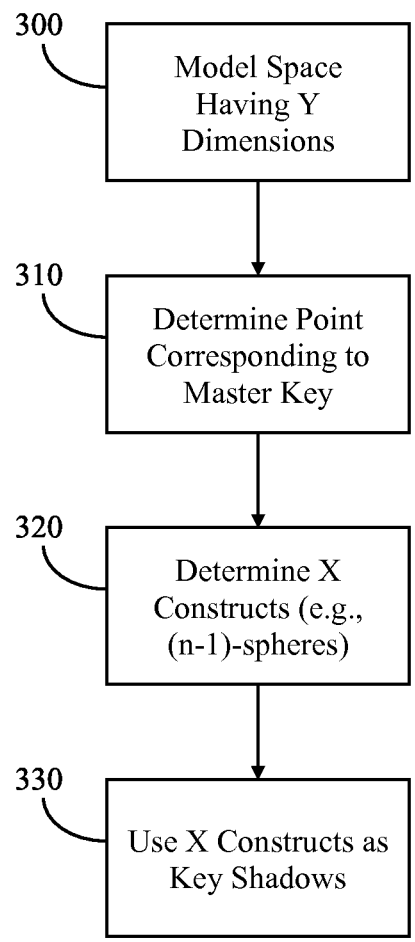
FIG. 3 illustrates a technique of generating key shadows for a master key using n-space mathematic principals according to aspects of the subject technology.

Any Y of the X centers combined with the pre-defined radius r in the n-space having Y dimensions will define (n−1)-spheres that intersect at two points, one of which corresponds to the master key. Y−1 of the X centers combined with the pre-defined radius r in the n-space having Y dimensions will define (n−1)-spheres that intersect in a circle. According to aspects of the subject technology, that circle will cover points representing the values of all possible master keys. Thus, according to some aspects of the subject technology, the centers of the (n−1)-spheres in the modeled space may be used as the key shadows. In FIG. 3, this step is more generally represented in step 330 as using descriptions of the constructs in the modeled space as the key shadows.

Preferably, each (n−1)-sphere defined by the X centers are verified to intersect with each of the other (n−1)-spheres defined by the other X centers at the point corresponding to the master key. This verification is intended to account for discrepancies that may occur when a computing device performs the associated computations. The incorporated document includes a discussion of other measures that may be taken to compensate for such discrepancies.

The key shadows determined as discussed above may be encrypted as discussed with respect to FIGS. 1 and 2. Therefore, given Y of the personal keys used to encrypt the key shadows, sufficient information will be obtained to generate a range of more than one possible master keys (i.e., in this case 2) that can be computationally feasibly searched for the master key. Without Y of the personal keys, insufficient information will be obtained to determine any part of a value for the master key.

Decryption

Other aspects of the subject technology include methods of decrypting a message using key shadows performed by at least one computing device including at least one tangible computing element. The method includes determining at least Y key shadows. The Y key shadows are sufficient to generate a range of more than one possible master keys that can be computationally feasibly searched for a master key. Less than Y of those key shadows is insufficient to determine any part of a value for the master key. The method also includes determining the master key based on the Y key shadows and decrypting the message using the master key.

In some aspects, determining at least Y key shadows may further include receiving Y personal keys and decrypting Y encrypted key shadows using the Y personal keys. The Y encrypted key shadows may have been concatenated to the message.

Figure 4:
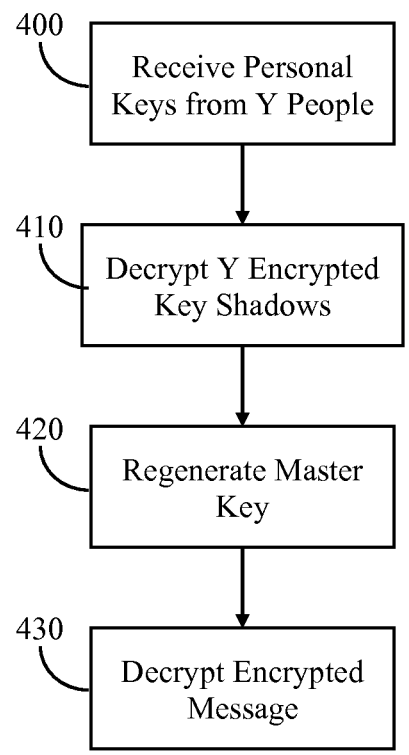
FIG. 4 illustrates aspects of decrypting an encrypted message using encrypted key shadows according to aspects of the subject technology.

FIG. 4 illustrates aspects of decrypting an encrypted message using encrypted key shadows according to aspects of the subject technology. At least Y personal keys are received in step 400. Those Y personal keys are used to decrypt at least Y key shadows in step 410. In step 420, a master key is regenerated from the Y decrypted key shadows. For example, the key shadows may be Y centers of (n−1)-spheres with pre-defined radius r that intersect at a point corresponding to the master key and possibly one other point, with n equal to Y. This point may be determined using techniques described in the incorporated document or some other technique. The master key may be used to decrypt the encrypted message in step 430.

Revoking a Personal Key

As long as control is maintained of the stored combination of master keys and encrypted message, a person's personal key may be revoked by deleting, over-writing, zeroing out, or otherwise obliterating the key shadow encrypted with that person's key. Thus, if someone leaves an organization, their ability to contribute to decrypting the encrypted message may be revoked without the person's participation.

Z Parts

In the instance of very long master keys (e.g., 512, 1024, or 2048 bits), the mathematics involved in determining key shadows from a single point that corresponds to a particular master key may be cumbersome. Thus, in some aspects, the master key may be divided into Z parts. The process discussed with respect to FIG. 3 may then be performed on each of those parts as if that part was a master key. The resulting collection of Z times X key shadows may then be stored along with the encrypted message. Likewise, the process described with respect to FIG. 4 may also be repeated with respect to each of those parts, and then the Z parts corresponding to the master key may be used for decryption.

In more detail, determining the X key shadows may further include dividing the master key into Z parts, and for each of the Z parts of the master key, determining a part of each of the X key shadows. Determining the part of each of the X key shadows may further include determining a point in a space having Y dimensions, wherein at least a part of the coordinates of the point in the space correspond to one of the Z parts of the master key, and determining at least X geometric constructs in the space that intersect at the point in the space. Each of the geometric constructs preferably may be determined from one part of each of the X key shadows. Determining the Z parts of each of the X key shadows for each of the Z parts of the master key may also include repeating determining the point and determining at least the X geometric constructs Z times.

Figure 5:
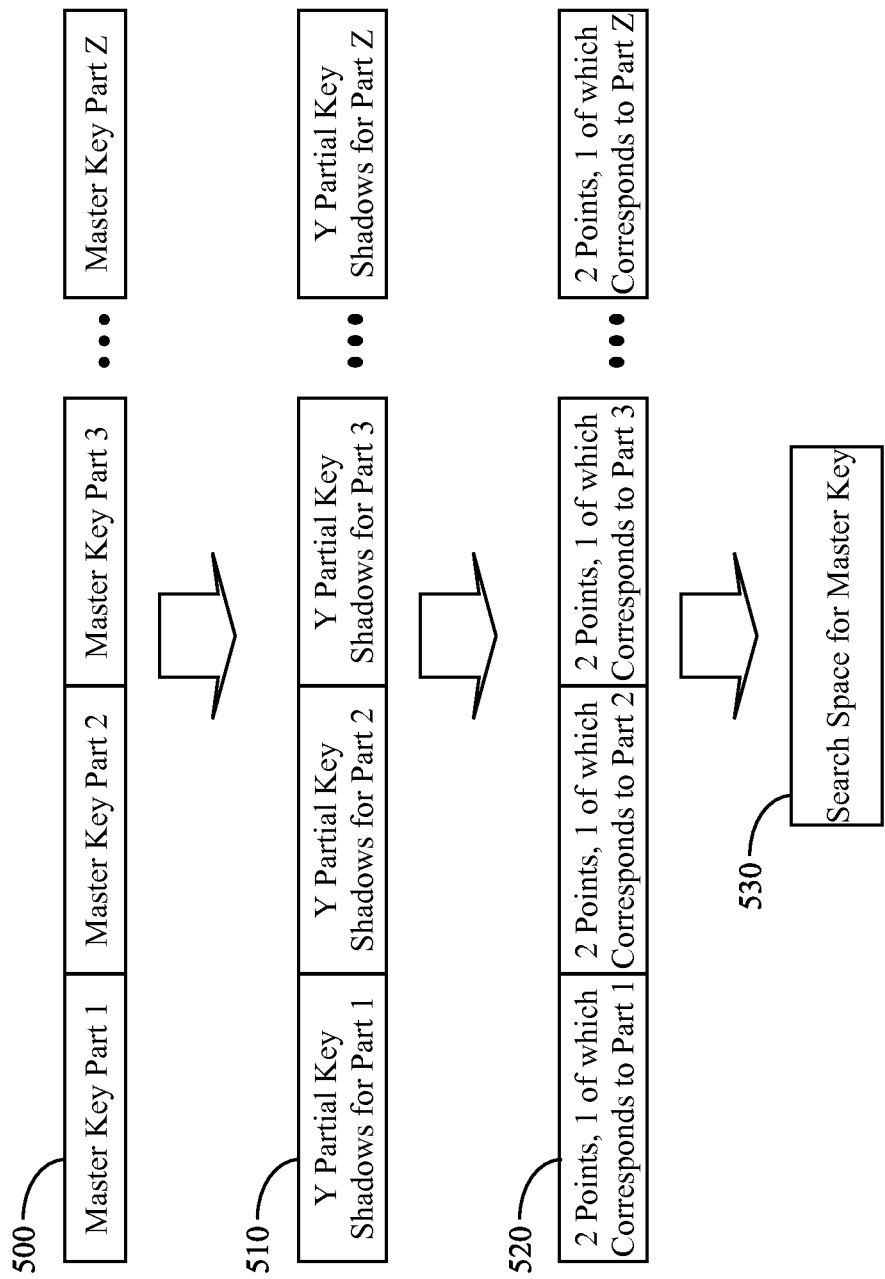
FIG. 5 illustrates some implications of dividing the master key into Z parts.

FIG. 5 illustrates some implications of dividing the master key into Z parts (or alternatively determining Z points that in turn determine Z parts of the master key). In FIG. 5, the master key has been divided into Z parts 500. While 4 parts are shown, Z may be any number equal to or greater than 1. While equal sized parts are preferred, this need not be the case.

X partial key shadows have been determined in FIG. 5 for each of the Z parts of the master key, for example as described with respect to FIG. 3. In some aspects, Y sets 510 of those partial key shadows for a part of the master key are necessary and sufficient to determine two points 520 in a modeled space that correspond to that part of the master key. Thus, a total of $2^Z$ points may be defined by Y sets of Z partial key shadows.

In some aspects, only one set of Z points in those $2^Z$ points corresponds to the master key. In other words, Y key shadows may be sufficient to generate a range of $2^Z$ possible master keys. Hence, Y personal keys (which decrypt Y sets of Z partial key shadows) preferably are sufficient to generate a range of $2^Z$ possible master keys. In some aspects, Z is chosen so that $2^Z$ represents a number of the possible master keys that can be computationally determined within an average human lifespan using a defined set of computational resources. In step 530, the total range of possible master keys may be searched for the master key, which in turn may be used to decrypt the encrypted message.

One implication of each set of Y (n−1)-spheres intersecting at two points is that a brute force attack that attempts to find the Y personal keys must, for each set of possible personal keys, run through the entire range of possible master keys to determine a failure. Thus, a brute force attack against the encrypted key shadows should be computationally infeasible.

In some aspects, no two centers of the (n−1)-spheres corresponding to portions of key shadows are co-linear with the point in the space corresponding to the associated portion of the master key. Otherwise, two of those (n−1)-spheres would intersect at a single point, reducing the range of possible master keys by half. However, as long as the rest of the technique is implemented properly, this reduction in range should not have practical real-world consequences.

Figure 6:
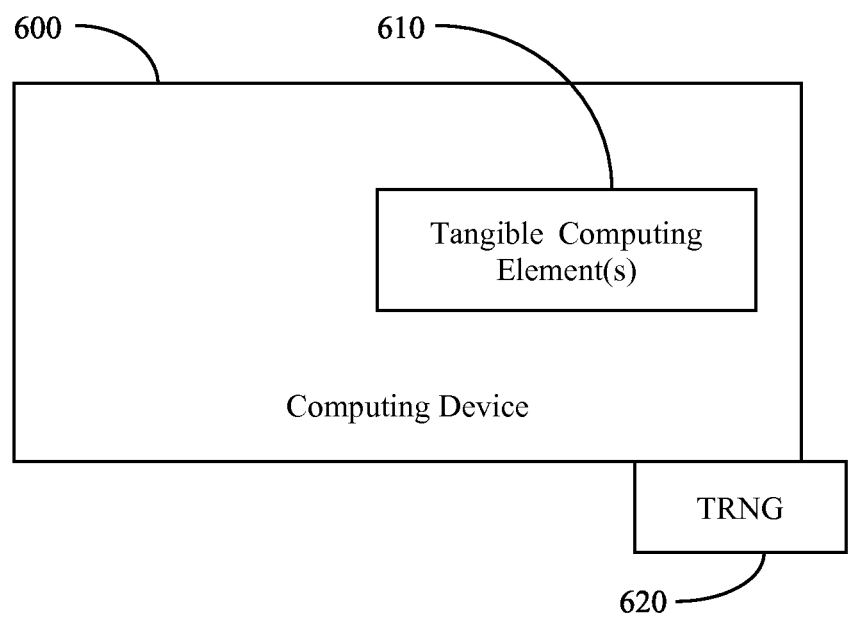
FIG. 6 illustrates a computing device including at least a tangible computing element that may be used to implement aspects of the subject technology.

The subject technology may be performed by one or more computing devices such as computing device 600 in FIG. 6. The computing device preferably includes at least a tangible computing element 610. Examples of a tangible computing element include but are not limited to a microprocessor, application specific integrated circuit, programmable gate array, and the like. A tangible computing element may operate in one or more of a digital, analog, electric, photonic, and/or some other manner. Examples of a computing device include but are not limited to a mobile computing device such as a smart phone or tablet computer, a wearable computing device (e.g., Google® Glass), a laptop computer, a desktop computer, a server, a client that communicates with a server, a smart television, a game counsel, a part of a cloud computing system, a virtualized computing device that ultimately runs on tangible computing elements, or any other form of computing device. The computing device preferably includes or accesses storage for instructions and data used to perform steps such as those discussed above. In some aspects, computing device 600 includes or has an interface to true random number generator (TRNG) 620.

Additionally, some operations may be considered to be performed by multiple computing devices. For example, steps of receiving may be considered to be performed by a local computing device, a remote computing device, or both. Communication between computing devices may be through one or more other computing devices and/or networks.

The invention is in no way limited to the specifics of any particular embodiments and examples disclosed herein. For example, the terms "aspect," "example," "preferably," "alternatively" and the like denote features that may be preferable but not essential to include in some embodiments of the invention. In addition, details illustrated or disclosed with respect to any one aspect of the invention may be used with other aspects of the invention. Additional elements and/or steps may be added to various aspects of the invention and/or some disclosed elements and/or steps may be subtracted from various aspects of the invention without departing from the scope of the invention. Singular elements/steps imply plural elements/steps and vice versa. Some steps may be performed serially, in parallel, in a pipelined manner, or in different orders than disclosed herein. Many other variations are possible which remain within the content, scope and spirit of the invention, and these variations would become clear to those skilled in the art after perusal of this application.

What is claimed is:

1. A method of generating key shadows performed by at least one computing device including at least one tangible computing element, comprising:
   receiving an indication of a first number X representing how many of key shadows are to be generated;
   receiving an indication of a second number Y representing how many of the key shadows are to be required for decrypting an encrypted message;
   determining or receiving a master key for decrypting the encrypted message; and
   determining X key shadows of the master key, wherein Y of those key shadows is sufficient to generate a range of more than one possible master keys that can be computationally feasibly searched for the master key, and wherein less than Y of those key shadows is insufficient to determine any part of a value for the master key;
   wherein determining the X key shadows further comprises:
      dividing the master key into Z parts; and
      for each of the Z parts of the master key, determining a part of each of the X key shadows;
   wherein determining the part of each of the X key shadows further comprises:
      determining a point in a space having Y dimensions, wherein at least a part of the coordinates of the point in the space represents or can be combined to represent one of the Z parts of the master key; and
      determining at least X geometric constructs in the space that intersect at the point in the space; and
   wherein each of the geometric constructs can be determined from one part of each of the X key shadows.

2. A method as in claim 1, further comprising encrypting each of the X key shadows with a different one of X personal keys.

3. A method as in claim 2, further comprising concatenating the encrypted X key shadows to the encrypted message.

4. A method as in claim 1, wherein determining the Z parts of each of the X key shadows for each of the Z parts of the master key further comprises repeating determining the point and determining at least the X geometric constructs Z times.

5. A method as in claim 1, wherein the geometric constructs comprise at least portions of n-spheres in the space.

6. A method as in claim 5, wherein the centers of the n-spheres are restricted to lie within the space.

7. A method as in claim 5, wherein the point in the space is not collinear with any pair of the centers of the n-spheres in the space.

8. A method as in claim 1, wherein Z is an integer greater than 1.

9. A method as in claim 1, wherein the range of the possible master keys includes at least $2^Z$ of the possible master keys, and wherein $2^Z$ represents a number of the possible master keys that can be computationally determined within an average human lifespan.

10. A method of decrypting a message using key shadows performed by at least one computing device including at least one tangible computing element, comprising:
    determining at least Y key shadows, wherein the Y key shadows are sufficient to generate a range of more than one possible master keys that can be computationally feasibly searched for a master key, and wherein less than Y of those key shadows is insufficient to determine any part of a value for the master key;
    determining the master key based on the Y key shadows; and
    decrypting the message using the master key;
    wherein determining the master key from the Y key shadows further comprises:
       dividing each of the Y key shadows into Z parts; and
       determining each of Z parts of the master key from parts of the Y key shadows; and wherein determining each of the Z parts of the master key further comprises:
modeling Y geometric constructs in a space having Y dimensions based on parts of the Y key shadows; and
determining at least one point in the space based on the Y geometric constructs, wherein at least a part of the coordinates of the point in the space represents or can be combined to represent one of the Z parts of the master key.

11. A method as in claim 10, wherein determining at least Y key shadows further comprises:
receiving Y personal keys; and
decrypting Y encrypted key shadows using the Y personal keys.

12. A method as in claim 10, wherein the Y encrypted key shadows were concatenated to the message.

13. A method as in claim 10, wherein determining each of Z parts of the master keys from parts of the Y key shadows further comprises repeating the steps of modeling Y geometric constructs and determining at least one point in the space based on the Y geometric constructs Z times.

14. A method as in claim 13, wherein the geometric constructs comprise at least portions of n-spheres in the space.

15. A method as in claim 14, wherein the centers of the n-spheres lie within the space.

16. A method as in claim 13, wherein Z is an integer greater than 1.

17. A method as in claim 13, wherein determining at least one point in the space based on the Y geometric constructs further comprises determining a pair of points in the space;
wherein at least a part of the coordinates of one of the pair of points in the space represents or can be combined to represent one of the Z parts of the master key; and
wherein the coordinates of the other of the pair of points in the space does not represent and cannot be combined to represent any part of the value for the master key.

18. A method as in claim 17, wherein the coordinates of the Z pairs of the points represent or can be combined to represent the range of possible master keys;
wherein the range of possible master keys includes $2^Z$ of the possible master keys, only one of which is the master key; and
further comprising searching the possible master keys for the master key.

* * * * *